United States Patent [19]

Iino

[11] Patent Number: 5,034,732
[45] Date of Patent: * Jul. 23, 1991

[54] HEAD UP DISPLAY APPARATUS FOR AUTOMOTIVE VEHICLE

[75] Inventor: Tadashi Iino, Susono, Japan

[73] Assignee: Yazaki Corporation, Japan

[*] Notice: The portion of the term of this patent subsequent to May 16, 2006 has been disclaimed.

[21] Appl. No.: 351,548

[22] Filed: May 15, 1989

Related U.S. Application Data

[63] Continuation of Ser. No. 152,489, Feb. 5, 1988, Pat. No. 4,831,366.

[51] Int. Cl.$^5$ ............................................. G09G 3/02
[52] U.S. Cl. .................................. 340/705; 340/980; 350/174; 353/14
[58] Field of Search ............... 340/705, 461, 980, 97, 340/52 R, 98; 350/174, 606, 607, 632, 637, 639; 353/13, 14; 358/103, 104, 93, 250

[56] References Cited

U.S. PATENT DOCUMENTS

| 4,711,544 | 12/1987 | Iino et al. |
|---|---|---|
| 4,714,320 | 12/1987 | Branbury . |
| 4,746,206 | 5/1988 | Kusztos et al. . |
| 4,787,711 | 11/1988 | Suzuki ................................ 350/174 |
| 4,804,836 | 5/1989 | Iino . |
| 4,806,904 | 2/1989 | Watanuki . |
| 4,831,366 | 5/1989 | Iino . |
| 4,837,551 | 6/1989 | Iino . |
| 4,886,328 | 12/1989 | Iino ................................ 340/980 |

FOREIGN PATENT DOCUMENTS

| 2154020 | 8/1985 | United Kingdom . |
|---|---|---|
| 2154757 | 9/1985 | United Kingdom . |
| 2182456 | 5/1987 | United Kingdom . |

Primary Examiner—Jeffery A. Brier
Assistant Examiner—M. Fatahi Yar
Attorney, Agent, or Firm—Wigman & Cohen

[57] ABSTRACT

In a head up display apparatus for an automotive vehicle including a projector unit disposed at the ceiling of the automotive vehicle to project display images and a half-mirror reflector unit for reflecting the projected display images to the driver, the height of the half-mirror reflector unit and the angular position of the projector unit are automatically adjusted according to vehicle speed, so that virtual display images can be appropriately seen by the driver ahead of the half mirror reflector unit along the driver's eye direction variable according to vehicle speed, by use of a relatively small half-mirror reflector unit.

9 Claims, 5 Drawing Sheets

LOW SPEED

HIGH SPEED

HEAD UP DISPLAY APPARATUS FOR AUTOMOTIVE VEHICLE

This is a continuation of co-pending application Ser. No. 07/152,489 filed on Feb. 5, 1988 now U.S. Pat. No. 4,831,36.

BACKGROUND OF THE INVENTION

1. Field of the Invention

The present invention relates to a head up display apparatus for an automotive vehicle such that display images from a projector is reflected from a transmittable and reflectable optical element (half-mirror) disposed on the dashboard to the driver, so that the driver can see the reflected display images (e.g. vehicle speed) in superimposition upon the vehicle outside view.

2. Description of the Prior Art

The same applicant has recently proposed a head up display apparatus for an automotive vehicle which can allow the driver to simultaneously see the normal outside view and display images projected from a projector and reflected from a half-mirror reflector unit. However, since the driver's eye direction is different between when the vehicle is running in a city at low speed and when running on a speedway at high speed, it is necessary to adjustably pivot the half-mirror reflector unit so that the display image reflected from the reflector unit can correctly be directed toward the driver. In addition, since the driver's eye position changes according to the driver's structure of body or driver's driving position, it is also necessary to adjustably move the reflector unit up and down.

Therefore, there exists a problem in that a wide and large half-mirror reflector unit is inevitably required and therefore the driver's frontward field of view is reduced into unsafe condition.

The arrangement of the head up display apparatus for an automotive vehicle will be described in further detail with reference to the attached drawings under DETAILED DESCRIPTION OF THE PREFERRED EMBODIMENTS.

SUMMARY OF THE INVENTION

With these problems in mind, therefore, it is the primary object of the present invention is to provide a head up display apparatus for an automotive vehicle which can correctly reflect display images related to the vehicle from the reflector unit of relatively small size to the driver irrespective of vehicle speed.

To achieve the above-mentioned object, a head up display apparatus for an automotive vehicle according to the present invention comprises projecting means, disposed at a ceiling of the automotive vehicle, for projecting display images; first actuator means, coupled to said projecting means, for pivoting said projecting means to adjust a projection direction of the display images; half mirror reflecting means, disposed on a dashboard of the automotive vehicle, for reflecting the display images projected by said projecting means to a driver; second actuator means, coupled to said half mirror reflecting means, for moving said half mirror reflecting means up and down to adjust a height of said half mirror reflecting means from the dashboard; sensor means for detecting vehicle speed; and control means, coupled to said first and second actuator means and said sensor means, for controlling an angular position of said projecting means and a height position of said half mirror reflecting means according to vehicle speed detected by said sensor means to automatically form virtual display images ahead of said half mirror reflecting means in a driver's eye direction variable according to vehicle speed.

Further, it is preferable that the head up display apparatus further comprises third actuator means for tilting said half mirror reflecting means upward or downward to adjust an angular position of said reflecting means so that display images can be correctly reflected from the reflecting means to the driver. Further, said control means controls said projecting means and said reflecting means in accordance with forward or feedback control method on the basis of table look-up method in response to detected vehicle speed.

In the head up display apparatus of the present invention, since the height of the half-mirror reflecting means and the angular position of the projecting means are both automatically adjusted according to vehicle speed, the driver can always see virtual display images ahead of the windshield on the half-mirror reflecting means in the driver's eye direction variable according to vehicle speed, in spite of relatively small reflecting means.

BRIEF DESCRIPTION OF THE DRAWINGS

The features and advantages of the head up display apparatus for an automotive vehicle according to the present invention will be more clearly appreciated from the following description of preferred embodiments of the invention taken in conjunction with the accompanying drawings in which like reference numerals designate the same or similar elements or sections throughout the figures thereof and in which.

DETAILED DESCRIPTION OF THE PREFERRED EMBODIMENTS

Figure 1:
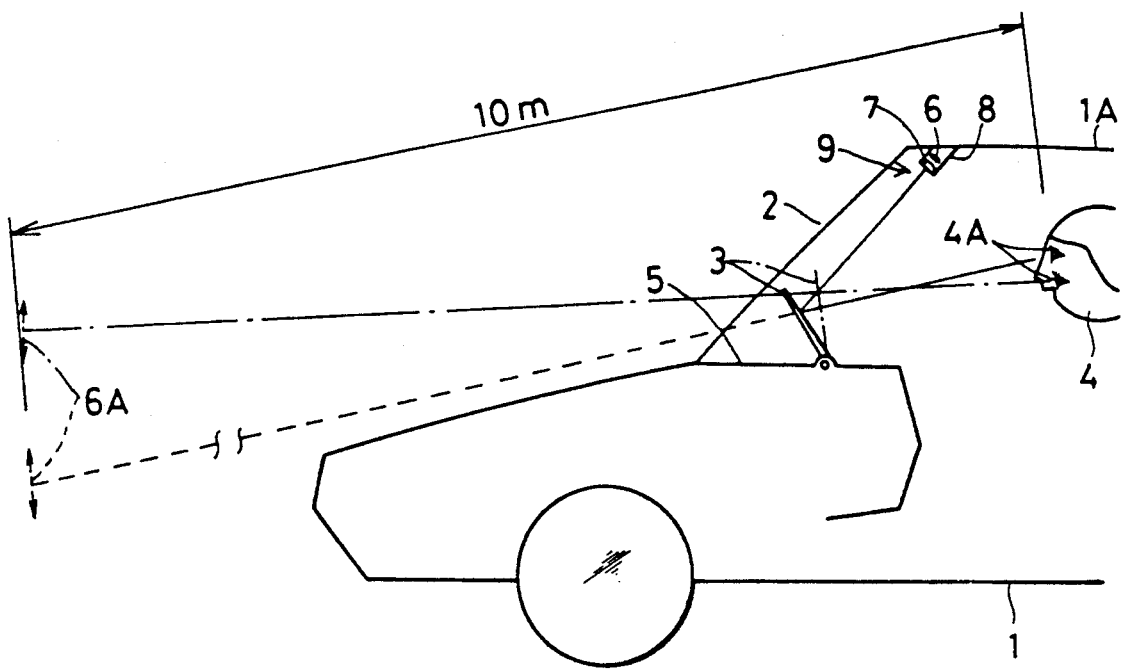
FIG. 1 is a diagrammatical side view showing a head up display apparatus applied to an automotive vehicle, for assistance in explaining problems involved therein.

FIG. 1 shows a head up display apparatus for an automotive vehicle, which has recently been proposed by the same applicant. In the drawing, a reflector unit 3 such as a half mirror having appropriate reflectivity and transmissivity is disposed on a dashboard 3 and in front of a windshield 2 within an automotive vehicle. The numeral 4 denotes a driver and 4A denotes a driver's eye. On the other hand, a projector unit 9 composed of a display device 6 for displaying various information such as vehicle speed, an optical element 7 such as a convex lens for projecting display images on the reflector unit 3, and a casing for housing the display device 6 and the optical element 7.

The projector unit 9 is attached to a ceiling 1A of the vehicle 1. The optical element 7 serves to form a virtual displayed image 6A produced from the display device 6 at a remote position ahead of the windshield 2 and away from the eye position 4A of the driver 4.

Therefore, the driver 4 can see a display image projected from the display device 6 via the optical element 7 and reflected from the reflector unit 3 at a remote position 10m, for instance, away from the driver's eye in superimposition upon the outside view of the vehicle.

Figure 2:
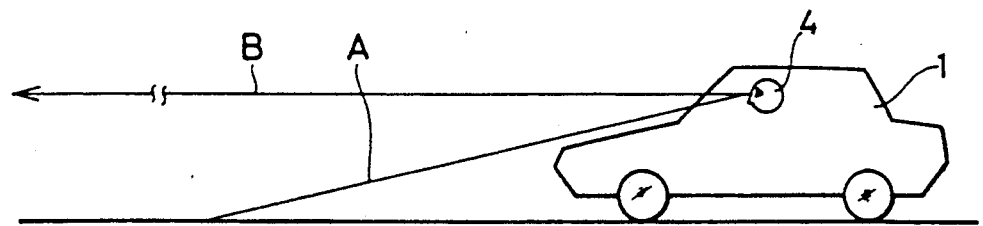
FIG. 2 is an illustration for assistance in explaining a change in driver's eye direction.

However, as depicted in FIG. 2, when the vehicle is running in a busy street at low speed, the driver's eye is usually directed toward a relatively near position on the road as shown by the arrow A; and when the vehicle is running on a speedway at high speed, the drivers eye is directed toward a relatively far position on the road as shown by the arrow B.

Therefore, in the display apparatus shown in FIG. 1, it is necessary to adjustably tilt the reflector unit 3. However, since the display images should appropriately be reflected toward the driver even when the reflector unit 3 is tilted upward or downward by manual operation according to the driver's eye direction, there exists a problem in that the size or the height of the reflector unit 3 should be increased, and therefore the frontward field of view of the driver is reduced by the reflector unit 3 into unsafe condition. In addition, since the driver's eye position changes according to the driver's structure of body or driver's driving position, it is also necessary to adjustably move the reflector unit up and down and therefore the virtual display image 6A moves upward or downward on the reflector unit, thus it being impossible to see the display image in a fixed position on the reflector unit.

Figure 3:
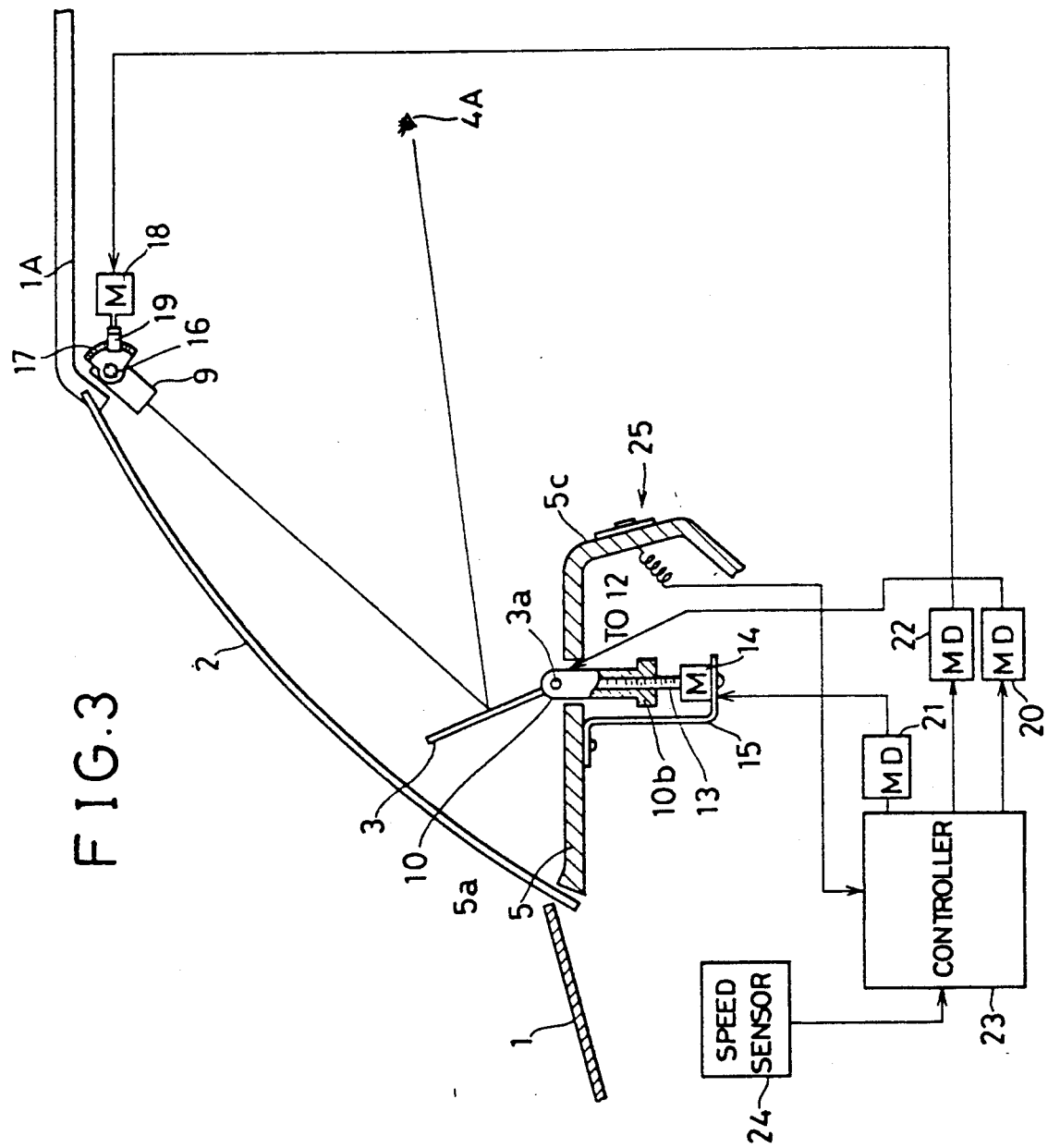
FIG. 3 is a diagrammatical side view, including a block diagram, showing an embodiment of head up display apparatus for an automotive vehicle according to the present invention.

FIG. 3 shows an embodiment of the head up display apparatus according to the present invention. The apparatus comprises roughly a half-mirror reflector unit, a projector unit and a control section. Further, the reflector unit is adjustably tilted upward or downward by a first actuator and moved up or down by a second actuator, and the projector unit is adjustably pivoted upside or downside by a third actuator all under control of the control section in response to a vehicle speed.

Figure 4:
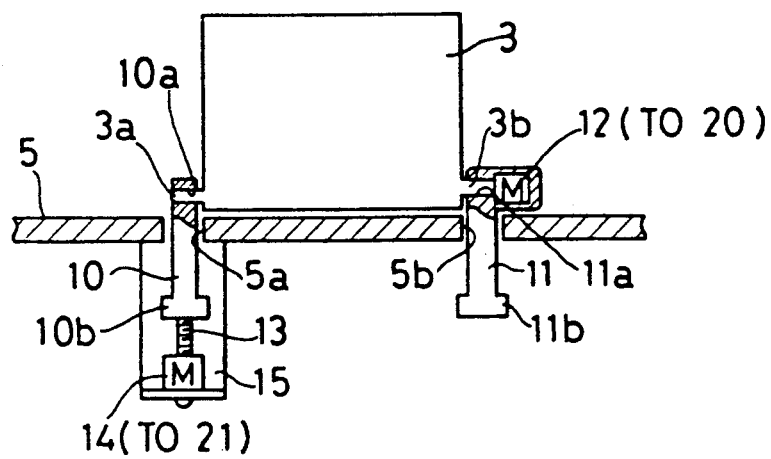
FIG. 4 is a partial front view of the display apparatus shown in FIG. 3.

In FIG. 4, a square half-mirror reflector unit 3 is formed with two pivotal axles 3a and 3b each projecting from the lower side portion thereof. These two pivotal axles 3a and 3b are each inserted into a bearing hole 10a or 11a formed respectively at the top end portion of each of two support members 10 and 11 to pivotably support the reflector unit 3 by the two support members 10 and 11. Further, one pivotal axle 3b is connected to a first actuator such as micromotor 12 housed in the support member 11.

The two support members 10 and 11 are fitted to two guide holes 5a and 5b, respectively, formed in the dashboard 5 so as to be movable up and down. Further, each of the two support members 10 and 11 is formed with a stopper portion 10b or 11b, so that the support members 10 and 11 are not extracted upward from the dashboard 5.

A female thread is formed in the support member 10 along the axial direction thereof so as to be engageable with a male thread shaft 13. A second actuator such as micromotor 14 fixed to an inner side of the dashboard 5 is connected to one exposed end of the thread shaft 13.

On the other hand, at the ceiling 1A of the vehicle 1, a pivotal projector unit 9 is attached as shown in FIG. 3. This projector unit 9 is fixed to a sector gear 17 rotatable about an axis 16. This sector gear 17 is in mesh with a pinion gear 19 connected to a third actuator such as micromotor 18 fixed to the ceiling 1A.

In FIG. 3, the control section comprises a first motor driver 20 for driving a first actuator 12 which tilt the reflector unit 3 so as to face upward or downward; a second motor driver 21 for driving a second actuator 14 which moves the reflector unit 3 up and down; a third motor driver 22 for driving a third actuator 18 which pivots the projector unit 3 so that display images are projected at an upside or downside position on the reflector unit 3; a controller 23; a vehicle speed sensor 24; and an operation panel 25 mounted on the surface 5c of the dashboard 5.

Figure 5:
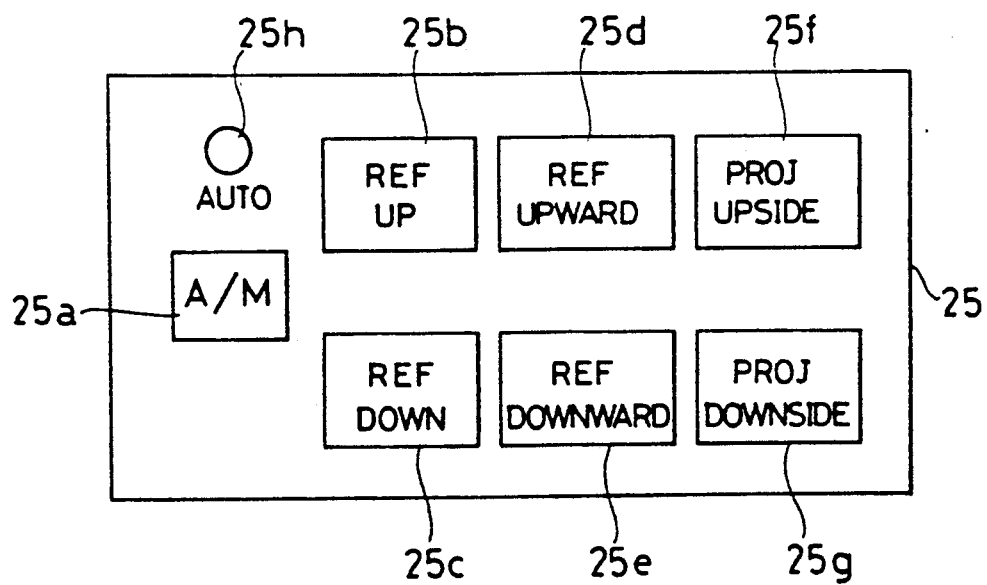
FIG. 5 is an illustration showing an operation panel of the display apparatus shown in FIG. 3.

FIG. 5 shows the operation panel 25 of the apparatus, which comprises an auto/manual selector switch (A/M) 25a; an auto indicator lamp (AUTO) 25h; a reflector moving-up button (REF UP) 25b; a reflector moving-down button (REF DOWN) 25c; a reflector tilting-upward button (REF UPWARD) 25d; a reflector tilting-downward button (REF DOWNWARD) 25e; a projector pivoting-upside button (PROJ UPSIDE) 25f; and a projector pivoting-downside button (PROJ DOWNSIDE) 25g.

Further, although not shown, there are provided a first sensor for detecting an angular position of the reflector unit 3; a second sensor for detecting a height position of the reflector unit 3; and a third sensor for detecting an angular position of the projector unit 9. Furthermore, the controller 23 stores a table which lists preferrable angular and height positions of the reflector unit 3 and preferable angular positions of the projector unit 9 according to detected vehicle speeds.

The operation of the apparatus will be described hereinbelow: when the auto/manual selector switch 25a is set to auto and therefore the auto indicator lamp 25h comes on, the vehicle speed sensor 24 applies a vehicle speed signal to the controller 23. In response to the vehicle speed signal, the controller 23 selects predetermined data indicative of appropriate height and angular positions of the reflector unit 3 and an appropriate angular position of the projector unit 9 in accordance with table look-up method, and generates three control signals to the three motor drivers 20, 21 and 22 on the basis of the selected data. Therefore, the reflector unit 3 and the projector unit 9 are adjustably moved to appropriate height and angular positions according to vehicle speed, until the selected data match height and angular positions detected by the three height and angular position sensors (not shown) provided for the three actuators 12, 14 and 18, respectively. In the above-mentioned operation, the reflector unit 3 and the projector unit 9 are controlled to target positions selected from a look-up table in response to the feedback values of the three height and angular position sensors (not shown) by feedback control method. Without being limited thereto, however, it is also possible to control the reflector unit 3 and the projector unit 9 to target positions selected from a look-up table by direct forward control method. In this control method, the three actuators such as step motors are directly moved to the target positions without providing the above-mentioned three height and angular position sensors (not shown).

Figure 6A:
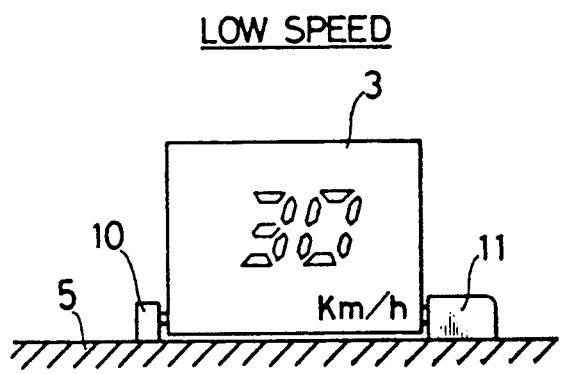
FIGS. 6(A) and (B) show examples of height positions of the half-mirror reflector unit and a display image on the reflector unit.
Figure 6B:
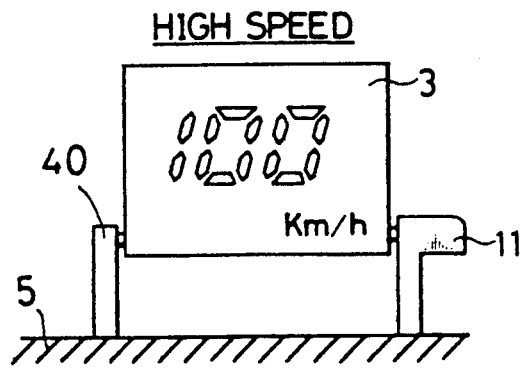

FIG. 6(A) shows an example of the adjusted height position of the reflector unit 3 obtained when the vehicle speed is low; and FIG. 6(B) shows an example of the adjusted height position thereof obtained when the vehicle speed is high. Further, the projection direction of the projector unit 9 is also adjusted by pivoting the unit 9 in linkage with the movement of the reflector unit 3.

On the other hand, when the auto/manual selector switch 25a is set to manual and therefore the auto indicator 25h goes off, the reflector unit 3 can be moved up or down and tilted upward or downward and the projector unit 9 is pivoted by depressing the buttons 25b to 25g, irrespective of vehicle speed, so that the driver can adjustably move the reflector unit 3 and the projector unit 9 in manual operation.

Figure 7:
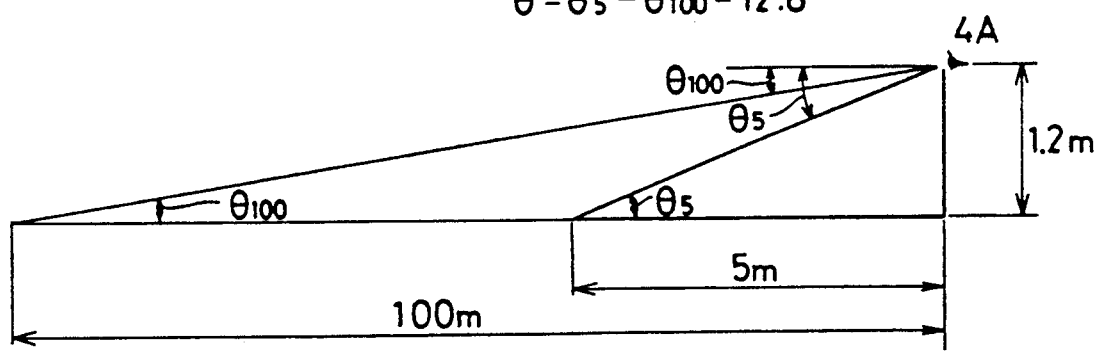
FIG. 7 is a diagram showing the relationship between vehicle speed and driver's eye direction.

FIG. 7 shows an example of the relationship between the vehicle speed and the driver's eye direction. In this example, when the driver's eye position 4A is 1.2 m above the road and the driver drives the vehicle while seeing a position on the road 5 m ahead of the driver's eye, the driver's eye downward angle $\theta_5$ is about 13.5 degrees. In contrast with this, when he drives the vehicle while seeing a position on the road 100 m ahead of the driver's eye, the driver's eye downward angle $\theta_{100}$ is about 0.7 degrees. Therefore, the difference in driver's eye direction between when the driver sees a near position and when he sees a distant position is about 12.8 degrees.

Figure 8:
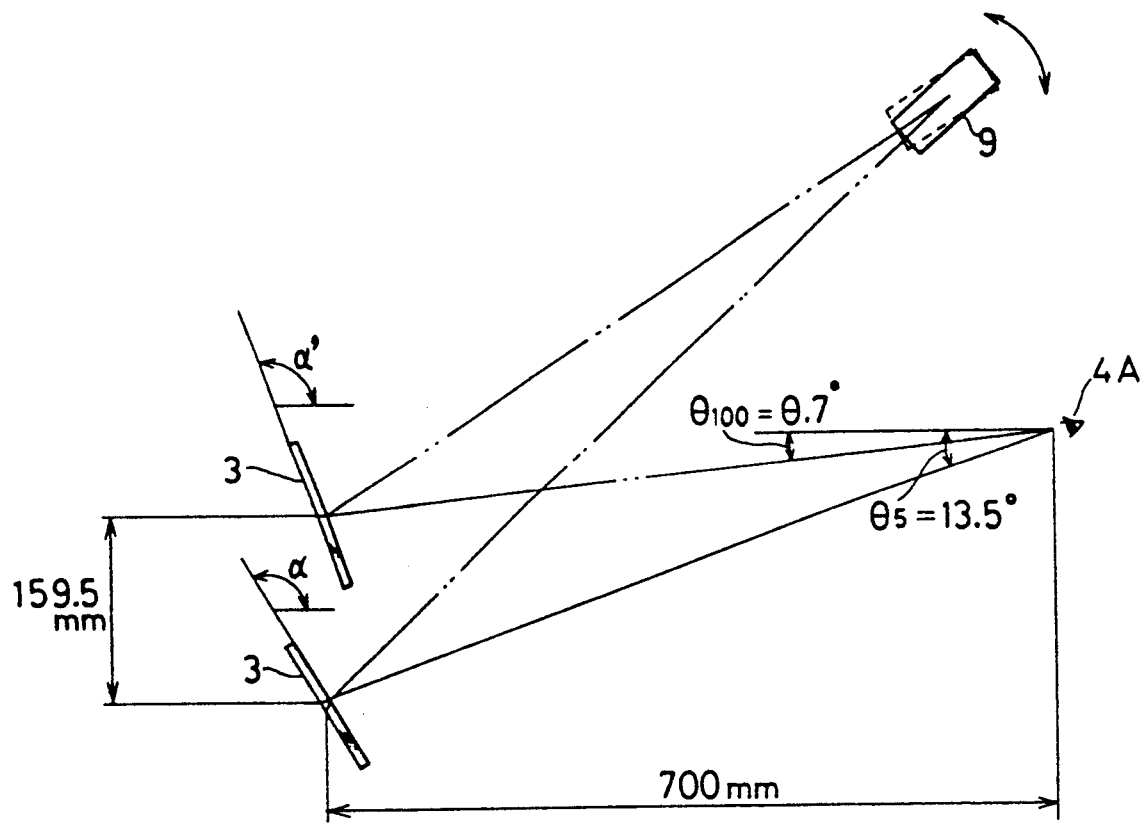
FIG. 8 is a view for assistance in explaining the positional relationship between driver's eye direction, reflector unit height, and display unit projection angle.

FIG. 8 shows a height difference 159.5 mm of the reflector unit 3 when a horizontal distance between the driver eye 4A and the reflector unit 3 is 700 mm under the same condition as shown in FIG. 7. This is because a virtual display image projected from the projector unit 9 to the reflector unit 3 should be observed by the driver in front of the windshield 2 along the driver's eye direction. As shown in FIG. 8, the reflector unit 3 should be adjusted from $\alpha$ to $\alpha'$ or vice versa and the projector unit 9 should be pivoted so that display images are reflected from a middle portion of the reflector unit 3 to the driver eye 4A. In summary, the reflector unit 3 is vertically moved up or down and tilted so as to face downward or upward and further the projector unit 9 is pivoted so that display images are projected to the reflector unit 3, in order that virtual display images can be displayed appropriately on the reflector unit 3 along the driver's eye direction variable according to vehicle speed.

In the above embodiment, the pivotal angle $\alpha$ (shown in FIG. 8) of the reflector unit 3 is adjusted. However, since the angular difference between the two $\alpha$ and $\alpha'$ is relatively small, it is possible to eliminate this angular adjustment of the reflector unit 3. In this case, the first actuator 12 (shown in FIG. 4) can be eliminated.

Figure 9:
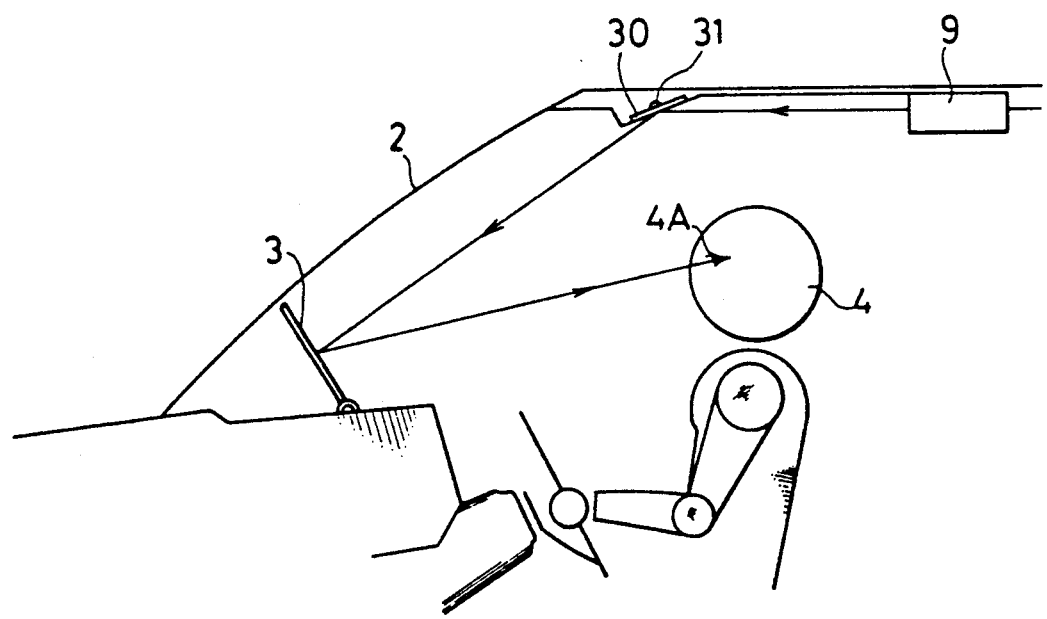
FIG. 9 is a diagrammatical side view showing another modification of head up display apparatus for an automotive vehicle according to the present invention.

FIG. 9 shows another modification of the head up display apparatus of the present invention, in which display images projected from the projector unit 9 is reflected by a reflecting mirror 30 pivotable about an axle 30 toward the reflector unit 3. In this modification the reflecting mirror 30 is adjustably pivoted by another actuator (now shown) and the pivoted angular position of the mirror 30 is detected by a sensor (not shown).

When the projector unit 9 and an optical system such as a reflector mirror 30 are used in combination, since the visual angle of a projected image is not wide, it is particularly preferable to incorporate the first, second and third actuators 12, 14 and 18 together in the apparatus.

As described above, in the head up display apparatus of the present invention, since the reflector unit and the projector unit are both adjusted according to vehicle speed, it is possible to automatically form virtual display images correctly on the reflector unit in the driver's eye direction and simultaneously to reduce the size of the reflector unit, thus realizing a head up display easy to see and safe in driving.

What is claimed is:

1. A head up display apparatus for an automotive vehicle, comprising:
   (a) projecting means, disposed within a passenger compartment of the automotive vehicle, for projecting display images;
   (b) half mirror reflecting means, disposed at a predetermined location within the passenger compartment of the automotive vehicle, for reflecting the display images projected by said projecting means to a driver;
   (c) first acuator means, coupled to said half mirror reflecting means, for moving said half mirror reflecting means up and down to adjust a height of said half mirror reflecting means relative to said predetermined location;
   (d) sensor means for detecting vehicle speed;
   (e) second actuator means, coupled to said half mirror reflecting means, for pivoting said half mirror reflecting means to adjust an angular position of said half mirror reflecting means so that display images can be correctly reflected from said half mirror reflecting means to the driver; and
   (f) control means, coupled to said first and second actuator means and said sensor means, for controlling a height and angular positions of said half mirror reflecting means according to vehicle speed detected by said sensor means to automatically form virtual display images ahead of said half mirror reflecting means in a driver's eye direction variable according to vehicle speed.

2. A head up display apparatus for an automotive vehicle, comprising:
   (a) projecting means including an optical system, disposed within a passenger compartment of the automotive vehicle, for projecting display images;
   (b) first actuator means, coupled to said projecting means, for pivoting said projecting means to adjust a projection direction of the display images;
   (c) half mirror reflecting means, disposed at a predetermined location with the passenger compartment of the automotive vehicle, for reflecting the display images projected by said projecting means to a driver;
   (d) second actuator means, coupled to said half mirror reflecting means, for moving said half mirror reflecting means up and down to adjust a height of said half mirror reflecting means relative to said predetermined location;
   (e) sensor means for detecting vehicle speed;
   (f) third actuator means, coupled to said half mirror reflecting means, for pivoting said half mirror reflecting means to adjust an angular position of said half mirror reflecting means so that display images can be correctly reflected from said half mirror reflecting means to the driver; and
   (g) control means, coupled to said first, second, and third actuator means and said sensor means, for controlling an angular position of said projecting means and height and angular positions of said half mirror reflecting means according to vehicle speed detected by said sensor means to automatically from virtual display images ahead of said half mirror reflecting means in a driver's eye direction variable according to vehicle speed.

3. The head up display apparatus for an automotive vehicle as set forth in claim 1, wherein said projecting means is disposed at a ceiling of the passenger compartment.

4. The head up display apparatus for an automotive vehicle as set forth in claim 2, wherein said projecting means is disposed at a ceiling of the passenger compartment.

5. The head up display apparatus for an automotive vehicle as set forth in claim 1, wherein said control means controls said projecting means and said half mirror reflecting means in accordance with table look-up method on the basis of detected vehicle speed.

6. The head up display apparatus for an automotive vehicle as set forth in claim 5, wherein said control means controls said projecting means and said half mirror reflecting means in direct forward control method.

7. The head up display apparatus for an automotive vehicle as set forth in claim 5, wherein said first actuator means comprises a sensor for detecting an angular position of said projecting means and said second actuator means comprises a sensor for detecting height position of said half mirror reflecting means, to control said projecting means and said half reflecting mirror means in feedback control method.

8. The head up display apparatus for an automotive vehicle as set forth in claim 1, which further comprises an operation panel including an auto/manual selector switch and buttons for manually adjusting a projection direction of said projector means and a height and an angular position of said half mirror reflecting means.

9. The head up display apparatus for an automotive vehicle as set forth in claim 2, which further comprises an operation panel including an auto/manual selector switch and buttons for manually adjusting a projection direction of said projector means and a height and an angular position of said half mirror reflecting means.

* * * * *